Figure 1:
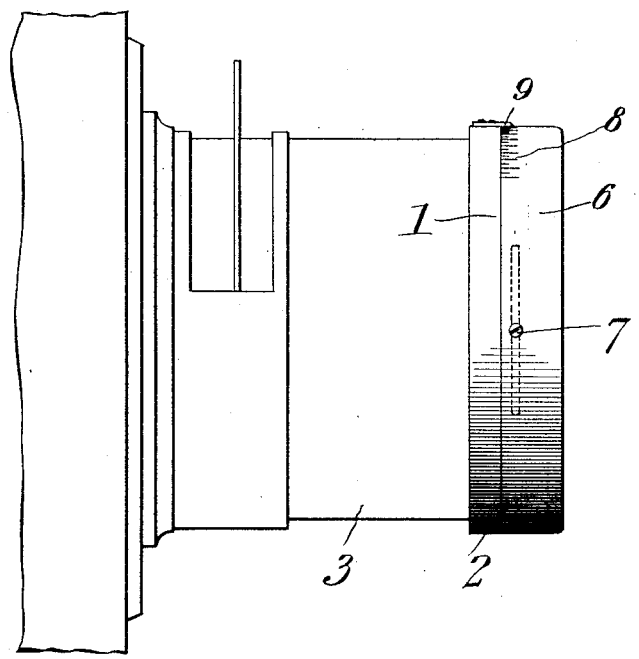

W. E. PHILLIPS.
PHOTOGRAPHIC LIGHT SCREEN OR FILTER.
APPLICATION FILED NOV. 17, 1906. RENEWED OCT. 26, 1910.

1,003,064.

Patented Sept. 12, 1911.

2 SHEETS—SHEET 1.

WITNESSES:

Willis E. Phillips   INVENTOR

ATTORNEYS

W. E. PHILLIPS.
PHOTOGRAPHIC LIGHT SCREEN OR FILTER.
APPLICATION FILED NOV. 17, 1906. RENEWED OCT. 26, 1910.

1,003,064.

Patented Sept. 12, 1911.

2 SHEETS—SHEET 2.

WITNESSES:

Willis E. Phillips INVENTOR

By C. A. Snow & Co.
ATTORNEYS

COLUMBIA PLANOGRAPH CO., WASHINGTON, D. C.

UNITED STATES PATENT OFFICE.

WILLIS EUGENE PHILLIPS, OF COLLBRAN, COLORADO.

PHOTOGRAPHIC LIGHT SCREEN OR FILTER.

1,003,064. Specification of Letters Patent. Patented Sept. 12, 1911.

Application filed November 17, 1906, Serial No. 343,913. Renewed October 26, 1910. Serial No. 589,261.

*To all whom it may concern:*

Be it known that I, WILLIS EUGENE PHILLIPS, a citizen of the United States, residing at Collbran, in the county of Mesa and State of Colorado, have invented a new and useful Photographic Light Screen or Filter, of which the following is a specification.

This invention relates to improvements in photographic light screens or filters and its object is to provide a means coacting with the photographic lens of a camera for causing the dispersion of the light normally producing the image upon the sensitive plate to such a controllable extent as to soften the lines of demarcation between light and shade and thereby prevent the offensively sharp definition normal to the lens when the latter is used for portraiture or artistic view photography.

The present invention is designed more particularly for use with the highly corrected modern lenses adapted for photographic work which lenses are corrected to give clear, sharp and crisp images. Such lenses are not well adapted to portrait work both because of the sharpness of definition and the over-contrast between light and shade and the prominence given facial defects. Various expedients have been resorted to in order to overcome the defects of such lenses for portrait and artistic view work, but even then the services of the retoucher are necessary in order to properly soften the lines of demarcation between light and shade and for the obliteration of the obtrusiveness of facial defects.

With the present invention the normal action of the photographic lens is so modified that the several defects mentioned are not at all apparent on the developed negative or finished picture and the necessity of retouching the negative is practically avoided.

By the present invention means are combined with a photographic lens, preferably as an attachment thereto whereby the lens may be used in the ordinary manner without modification of the image produced thereby, or such image may be so modified at the will of the operator that there is produced a diffusion of the light to substantially the same extent throughout the image but to a controllable degree whereby there is produced a softening and rounding of the image comparable to the results produced by a skilled retoucher. This is done by neutralizing to a greater or less degree and to a controllable extent the chromatic corrections of the lens so that the image as viewed on the ground glass focusing screen shows chromatic halation about the shadows with the result that in the finished photograph there is a degree of softening of the sharpness of the lines of demarcation and a lightening up of the shadows commensurate with the intensity and extent of the chromatic halation.

Figure 2:
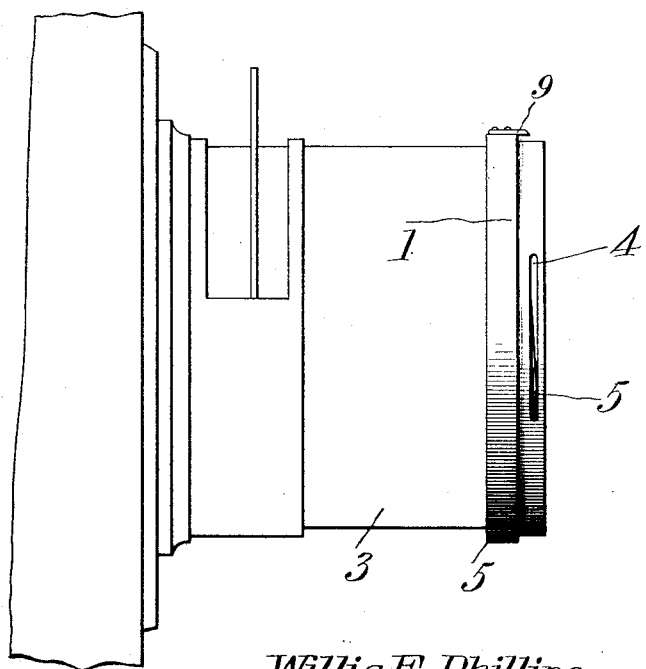
Figure 3:
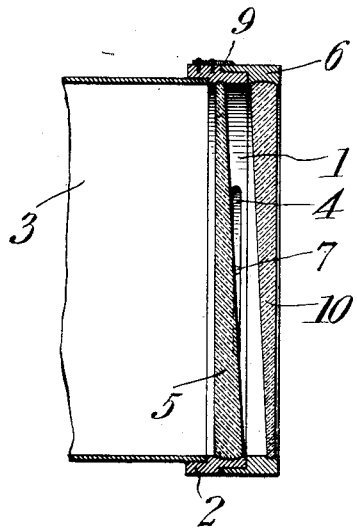
Figure 4:
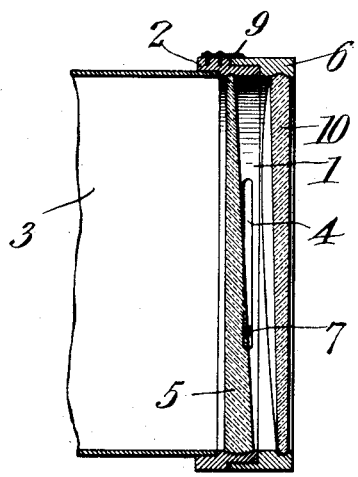
Figure 5:
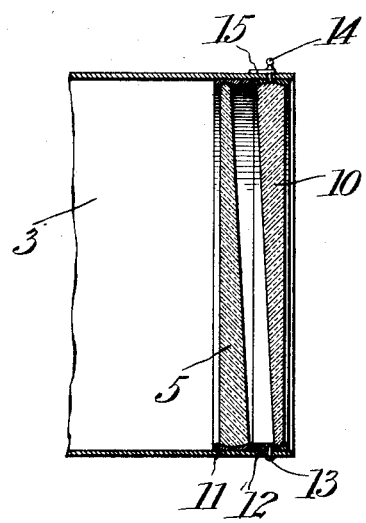

The invention will be best understood from a consideration of the following detail description taken in connection with the accompanying drawings, forming a part of this specification, in which drawings, Figure 1 is a side elevation of a photographic lens with the attachment applied thereto and showing a small portion of a photographic camera. Fig. 2 is a similar view showing the outer ring of the attachment removed. Fig. 3 is a longitudinal section through the attachment and showing a portion of the lens barrel. Fig. 4 is a similar view showing a different position of the parts. Fig. 5 is a view similar to Fig. 4 showing a modified form in which the device constitutes a permanent part of the photographic lens barrel.

Referring to the drawings there is shown a ring 1 constituting the rear section of the device, and the said ring has an annular enlargement 2 at its rear end adapted to fit around the end of the barrel 3 of a camera lens. The enlargement 2 is so proportioned as to fit tightly upon the end of the lens barrel and to be held against rotation by its frictional engagement. Slots 4 are formed within the ring 1 and extend partly therearound, and secured within said ring is a prism 5 of small angle and which is in fixed relation at all times to the ring 1. Rotatably mounted on the forward portion of the ring 1 is the front ring 6 of the device. This ring is adapted to abut against the enlargement 2 and has guide pins or screws 7 extending inward therefrom and into the slots 4 so as to hold the two rings against displacement in the direction of the optical axis but permit the ring 6 to partly rotate for a predetermined distance upon the ring 1. Graduations are formed upon the periphery of the ring 6, as indicated at 8, so as to designate the amount of movement of the ring 6, and an index finger 9 is secured upon the enlargement 2 of the ring 1 and extends over the graduated portion of the ring 6. A prism 10 of like small angle to the prism 5 is secured within the ring 6 and is normally disposed with its axis parallel to the axis of the prism 5.

It is well known that when two prisms of the same power are placed in reverse position with their axes parallel light passes through them without being affected. However, when one of the prisms is rotated with relation to the other so as to move the adjoining faces of the two prisms out of parallelism, all lines viewed through the prisms display the prismatic coloring or halo. This halation appears around each light spot and line, the colors following the order of the spectrum. The colors, of course, affect the photographic plate in proportion to their actinic values. The halo increases as the prisms are rotated toward 180° relative displacement and then diminishes as the prisms are returned to their original reverse positions. It will therefore be seen that by utilizing the arrangement of prisms herein described, the operator can shift the outer prism until the lines and shadows appearing therethrough become sufficiently softened by the prismatic coloring, and the diffusion of the light rays over the shadows will result in lightening up the shadows and the obliteration of obtrusively sharp demarcation between light and shadow. The device therefore becomes of great value in portrait work in that wrinkles, blotches and other facial blemishes, if objectionable, may be made to disappear upon the photographic negative. The device is also of value in view work since it causes the lighting up of or rendering less intense those shadows which are likely to appear too deep upon the finished picture. Also the general softening of the entire image is a result greatly desired in artistic view work.

While the device is preferably constructed in the form of an attachment as heretofore described, and as shown in Figs. 1 to 4 both inclusive, it is to be understood that, if desirable, the non-rotatable ring may be permanently secured within the lens barrel as shown at 11 in Fig. 5 and the outer or movable ring 12 may be rotatably mounted within the lens barrel and be provided with a guide pin 13 extended through a slot in said barrel and with an actuating knob 14 extending through another slot in the barrel, said knob carrying an index finger 15 adapted to coöperate with suitable graduations upon the lens barrel.

In the present invention it is the dispersive properties of the prisms which are utilized. When the prisms are in opposition then they optically neutralize each other and the light passes to the lens and is acted on by the lens as though the prisms were not present. When however the opposition of the prisms, considered optically, is disturbed by the relative rotation of the prisms about the optical axis of the lens then there is a corresponding dispersion of the light producing the effect known among photographers as diffusion which latter is in fact a softening or blurring of the image, but with the present invention this diffusion or blurring of the image is equal throughout. The degree of diffusion or blurring is of course commensurate with the degree of displacement of the prisms one relative to the other about the optical axis of the lens.

While in the foregoing description and drawings there has been revealed an apparatus eminently adapted for the purposes of the invention it is to be understood that the invention is by no means limited to the exact structure shown and described. The structure revealed may be modified in many ways while still retaining the salient features and the advantages of the invention.

What is claimed is:—

1. A camera attachment for softening the lines of demarcation between light and shade comprising a ring having slots extending partly therearound, a prism secured within the ring, a second ring mounted to partly rotate on the first mentioned ring, projecting devices therein and movable within the slots, and a prism within said second ring, the adjoining faces of the prisms being normally parallel.

2. A camera attachment for softening the lines of demarcation between light and shade comprising a ring having slots extending partly therearound, a prism secured within the ring, a second ring mounted to partly rotate in the first mentioned ring, projecting devices therein and movable within the slots, a prism within said second ring, the adjoining faces of the prisms being normally parallel, said second ring having graduations thereon, and an index on the first mentioned ring coöperating with the graduations to indicate the relative positions of the prisms.

3. The combination with a lens tube of means for softening the lines of demarcation between light and shade, said means comprising contacting rings of uniform diameter, one of said rings surrounding the lens tube and provided with a slot, a guide device within the other ring and movable in the slot, said rings lapping, one of the rings having graduations thereon, an index upon the other ring and disposed adjacent to the graduations, and prisms of equal power secured within the respective rings, one of said prisms being movable with its ring to produce prismatic coloring around each object of the image produced.

4. An attachment for photographic lenses comprising two adjacent prisms, one rotatable with respect to the other about the optical axis of the lens and of such angle and so located as to produce a progressive resultant dispersion of the light rays to an extent to produce a blurring or diffusion of the image on a relative rotation of the prisms in a plane at right angles to the optical axis of the lens, and means for permitting such relative rotation of the prisms.

5. An attachment for photographic lenses comprising two similar, opposed, dispersive prisms, one being rotatable relative to the other about the optical axis of the lens, said prisms coacting to disperse the light rays when relatively rotated out of optical opposition to an extent to produce a blurring or diffusion in the image produced by the lens.

6. An attachment for photographic lenses comprising two dispersive prisms, one of which is rotatable relative to the other to a controllable extent, said prisms coacting to disperse the light rays when relatively rotated out of optical opposition to an extent to produce a blurring or diffusion in the image produced by the lens.

In testimony that I claim the foregoing as my own, I have hereto affixed my signature in the presence of two witnesses.

WILLIS EUGENE PHILLIPS.

Witnesses:
    CARL T. WASHBURN,
    CARR MARSHALL.

---

Copies of this patent may be obtained for five cents each, by addressing the "Commissioner of Patents, Washington, D. C."